United States Patent Office 3,823,202
Patented July 9, 1974

3,823,202
THERMOSET POLYESTER RESIN PARTICLES
Lloyd R. Buzbee, Pittsburgh, and Robert D. Lake, Monroeville, Pa., assignors to Koppers Company, Inc.
No Drawing. Continuation-in-part of abandoned application Ser. No. 215,628, Jan. 5, 1972. This application June 21, 1973, Ser. No. 372,398
Int. Cl. C08f 1/11
U.S. Cl. 260—861                 36 Claims

ABSTRACT OF THE DISCLOSURE

Clear cured polyester beads which have excellent reflex reflective properties are prepared by suspension polymerizing a curable resin composition comprising an unsaturated polyester and a vinyl monomeric crosslinking agent in the presence of a water soluble salt.

RELATED APPLICATIONS

This is a continuation-in-part of our copending application Ser. No. 215,628, filed Jan. 5, 1972 now abandoned.

BACKGROUND OF THE INVENTION

This invention relates to thermoset polyester beads prepared by suspension polymerizing an ethylenically unsaturated polyester with a vinyl monomeric crosslinking agent. More specifically, this invention relates to the preparation of cured polyester beads by improved clarity by suspension polymerizing the ethylenically unsaturated polyester with the vinyl monomeric crosslinking agent in the presence of a water soluble salt. The cured beads are clear, discrete solid particles having a substantially spherical shape which are substantially free from internal voids, surface irregularities, and encapsulated matter and which have excellent reflex reflective properties.

Unsaturated polyesters which are prepared, for example, by reacting an ethylenically unsaturated dicarboxylic acid or an anhydride thereof with a diol are well known. Such polyesters can be cured or crosslinked with a vinyl monomeric crosslinking agent, such as styrene. The polyesters are formed or molded into articles which are cured to yield products having generally good physical and electrical properties and good chemical resistance and weathering characteristics.

Although the most popular use of curable polyester resins is to combine them with fibrous reinforcements, such as glass fibers, and cure and mold liquid or prethickened masses of the resultant composition into thermoset plastic articles, it is known also to prepare thermoset polyester resins in the form of solid spheres or beads. It has been reported that such thermoset polyester resin spheres can be used as insulating agents and as propping agents to support underground fractures which are made adjacent to oil or gas wells for the purpose of increasing production.

The present invention relates to the preparation of clear, discrete thermoset polyester resin particles, particularly spherically shaped particles or beads which can be used in reflex reflective applications. The thermoset or cured polyester beads of this invention can be used to good advantage in place of other types of plastic beads and glass beads heretofore used in reflex reflective applications. In such applications, light passes through the particles or beads to a reflective surface from which it is reflected back through the bead and returned toward the light source. The reflection of light in such a manner is commonly referred to as reflex reflectivity. Ideally, the beads should have reflex reflective properties over a wide range of angles of illumination (the angle between the incident light beam and the reflective surface lying behind the beads).

An example of a reflux reflective application in which glass beads are used presently, and in which the cured polyester resin beads of this invention can be used, is in combination with highway marking paints. In this type of application, paint, usually white or yellow in color, is applied as a stripe to the center and/or edges of the highway. While the paint is still wet, beads are applied to the paint and adhere thereto when the paint dries. The paint serves as a binder for the beads and as a reflective layer. As light, for example, from vehicle headlights, passes through each bead, it is reflected by the paint back through the bead and then to the source. Reflex reflective beads are used also in highway and traffic signs.

For maximum effectiveness, the beads must be clear, that is substantially free of a milky or cloudy appearance and substantially free of white or colored particles; also, the beads must be essentially free of surface scratches and irregularities, free of internal voids and free of entrapped water or gas bubbles and spherically shaped so that light which enters the beads is reflected back through the beads instead of being scattered and/or absorbed. In addition, reflex reflective beads should have other properties such as for example, chemical stability, stability to sun, light and moisture resistance.

Presently, glass beads are used on a wide scale in reflex reflective applications. However, shortcomings of glass beads are: batches of glass beads usually contain a significant amount of agglomerated and non-spehrical particles and a wide size distribution range; glass beads have a tendency to be discolored readily by sulfide pollutants in in air and rain; glass beads are scratched and chipped easily when being handled before and during application and by traffc after they are applied; and they are relatively dense and are thus heavy to handle and transport. In adition, because of their density they are difficult to formulate into paint composition containing the beads.

It is known also to prepare reflex reflective beads from polymeric resinous materials, such as, for example, polymers of alkyl methacrylates. (See Gosselink, U.S. Pat. No. 3,355,311, Staehle et al. U.S. Pat. 2,378,252 and Greer et al. U.S. Pat. No. 3,428,514.) However, such materials have shortcomings in that they are dissolved readily by comon paint thinners and gasoline. Also, polymers of alkyl methacrylates have a rather low refractive index.

REPORTED DEVELOPMENTS

Heretofore known methods for preparing thermoset beads of polyester resins produced beads which are not suitable for use in light reflective applications and/or require a relatively long preparation time and/or have other shortcomings.

For example, see Kropa, U.S. Pat. No. 2,443,735 which discloses an emulsion polymerization method for producing particles of polyester resins. The reaction times disclosed in the examples of this patent are relatively long, for example 6–24 hours. Also, the resinous particles are neither clear, nor spherically shaped, nor sifinificantly reflex reflective.

In Reddie et al., U.S. Pat. No. 3,210,443 there is disclosed the preparation of particles of polyester resins by distributing a liquid solution of the reactants through orifices thereby forming drops of curable resin which fall downwardly through a gas, such as air, into a body of quiescent hot inert liquid in which the resin drops cure as they fall downwardly therethrough. Disadvantages and/or problems which are encountered in the practice of this method are the resinous beads are to large for use in many types of reflex reflective applications. In addition, the equipment needed to produce the beads on large scale is relatively expensive. Also, the orifices through which the resin is extruded can tend to clog and are troublesome to clean.

In Mayer et al., U.S. Pat. 3,708,560 there is disclosed a method for producing polyester prills in a manner very similar to that disclosed in the above cited Reddie patent. The polyester prills are useful as proppants in hydraulic fracturing of oil wells. These prills suffer from the same disadvantages as the plastic sphere propping agents of Reddie.

Kolodyn, U.S. Pat. No. 3,089,542 discloses an aqueous suspension polymerization method for producing polyester beads in the presence of a suspending agent, such as polyvinyl alcohol. The examples disclosed in this patent show a reaction cure time of 0.5 to 2 hours and an additional post cure time in an oven of 1–3 hours. Polyester beads produced by this method are cloudy and unacceptable for use in reflux reflective applications.

It has been proposed also to prepare particles of cured polyester resins by crushing or grinding masses of the cured polyester resin. However, experience has shown that the particles are not spherically shaped and have highly irregular surface and are, therefore, poor reflex reflectors.

In view of the above, it is an object of this invention to provide a method for forming discrete solid spherical particles of a thermoset polyester resin of improved clarity, particularly clear reflex reflective polyester beads.

SUMMARY OF THE INVENTION

In accordance with this invention there is provided a method for preparing cured polyester beads having reflex reflective properties comprising suspension polymerizing a curable resin composition of an unsaturated polyester and a vinyl monomeric crosslinking agent in the presence of a water soluble salt. The method comprises (a) forming an aqueous suspension of polymerizable liquid particles of a curable resin composition comprising an ethylenically unsaturated polyester and a vinyl monomeric crosslinking agent polymerizable therewith; said aqueous suspension including also a water soluble salt in an amount sufficient to improve the clarity of the cured bead particles; the aqueous suspension optionally and preferably contains a suspending agent for maintaining the liquid particles suspended in the aqueous phase during the curing step; and (b) curing the liquid particles while in a dispersed state into discrete solid cured polyester beads having reflex reflective properties by polymerizing the unsaturated polyester and the vinyl monomer.

It has been found in accordance with this invention that the use of water soluble salts in the aqueous suspension polymerization method described herein results in the production of cured polyester resin beads of improved clarity. It has been found also that the use of water soluble salts in the aqueous suspension polymerization method described herein produces cured polyester beads of such good clarity that they have excellent reflex reflective properties which make them very suitable for use in reflux reflective applications. It is noted that the reflex reflective property of a material is directly related to the clarity of the material; the clearer the material the better the reflex reflective property. It has also been found that the use of a suspending agent in combination with the water soluble salt can be utilized effectively to produce cured reflux reflective polyester beads substantially, all of which are spherical and free from internal voids and surface irregularities. The polyester beads also have a controllable size and size distribution. The beads are also substantially free from water droplets and/or gas bubbles encapsulated within the cured bead.

It was noted above that the suspension polymerization of polyesters with vinyl monomers per se is not new. For example, Kolodny, U.S. Pat. 3,089,542 (mentioned above) discloses the suspension polymerization of particles of polyester resins using polyvinyl alcohol as the suupending agent. In addition, water soluble salts have been used heretofore in suspension polymerizations. For example, Winslow, U.S. Pat. 2,712,536 discloses the aqueous suspension polymerization of vinyl monomers such as, for example, divinyl benzene alone or mixed with styrene in the presence of polyvinyl alcohol and sodium chloride. This patent discloses that sodium chloride, as well as other soluble inorganic materials can be added to the aqueous suspending medium to increase the specific gravity of the suspending medium. However, the use of the salts for improving clarity and producing reflex reflective polyester beads is not contemplated.

In addition, Okamato et al., U.S. Pat. 3,707,585 is directed to the suspension polymerization of vinyl monomers using an improved suspending agent in order to give excellent transparency to the resulting polymer. The suspending agent is an acrylic ester acrylamide copolymer. This patent also discloses the use of salts in combination with the polymeric suspending agent. However, the salts are used to adjust the pH of the system and not for improving the clarity. In addition, the salts are used in concentrations which are lower than that generally employed in the present invention. Some other interesting patents directed to suspension polymerization are Hamann et al., U.S. Pat. 3,728,318; Ott, U.S. Pat. 3,051,682 and Chomitz, U.S. Pat. 3,172,878. In addition, see Feltzin et al., U.S. Pat. 3,524,902.

However, it has not been heretofore known to utilize a water soluble salt in the aqueous suspension polymerization of a curable polyester resin composition to thereby produce cured polyester resin particles of improved clarity, particularly reflex reflective polyester beads.

As will be described more fully below, the reactants, amounts thereof and reaction conditions utilized in the method described herein can be selected to provide cured polyester resin particles substantially all of which are spherical in shape and of controlled size and size distribution; in addition, the cured particles can be produced in a relatively short time.

The method described herein can be used to produce cured polyester resin beads which are as much as 20% more reflective than glass beads presently sold commercially for use with highway marking paints. Another advantage of the polyester resin beads of this invention is that they have lower densities than glass beads used conventionally in reflux reflective applications—for example, often over 50% lower and within the range of about 1.1 to about 1.8 g./cc. This is important because a given weight of polyester beads can be used to cover a proportionally greater surface area than the same weight of glass beads. In addition, the polyester beads are easier to apply and can be premixed into a stable reflex reflective paint formulation.

Compared to plastic beads prepared from other types of polymeric resinous materials, the cured polyester resin beads of this invention have one or more desirable characteristics such as better solvent resistance, higher levels of clarity, better weathering characteristics, more uniformly and near perfectly spherically shaped improved surface characteristics, free from encapsulated gas bubbles or water, and essentially infusible at elevated temperatures.

DETAILED DESCRIPTION OF THE INVENTION

Polyesters that are utilized in the practice of this invention are ethylenically unsaturated polyesters which are capable of reacting with vinyl monomeric crosslinking agents to form thermoset polyester resins. Generally speaking, the unsaturated polyesters can be prepared by reacting polycarboxylic acids or anhydrides with polyols wherein at least a portion of the acid or anhydride of said reactants contains polymerizable ethylenic unsaturation. The most popularly used unsaturated polyesters are those formed by condensing a monoethylenically unsaturated (usually alpha-beta unsaturation) dicarboxylic acid or an anhydride thereof with a diol. Examples of ethylenically unsaturated dicarboxylic acids and anhydrides that can be used to prepare the unsaturated polyesters are maleic anhydride, fumaric acid, chloromaleic acid, itaconic acid, citraconic acid, and mesaconic acid. Examples of diols that can be used to prepare the unsaturated polyesters are ethylene glycol, propylene glycol, butylene glycol, diethylene glycol, dipropylene glycol, triethylene glycol, isopropylidene bis - (p - phenyleneoxypropanol-2), cyclohexanedimethanol, neopentyl glycol, and cyclobutanediol.

Unsaturated polyesters of the type described above are often modified by including additional reactants in the condensation reaction. Some examples of such reactants are saturated dicarboxylic acids and anhydrides thereof, alcohols having more than two hydroxyl groups, acids either saturated or unsaturated, containing more than two carboxylic groups, and monofunctional acids and alcohols. Specific examples of the aforementioned reactants are phthalic anhydride, isophthalic acid, tetrahydrophthalic anhydride, succinic acid, glutaric acid, adipic acid, pimelic acid, suberic acid, azelaic acid, sebacic acid, glycerol, pentaerythritol, trimellitic acid, pyromellitic acid, benzoic acid, and 2-ethylhexanol.

The acid number and molecular weight of the unsaturated polyester, which is essentially a linear polymer, can vary over a wide range, for example, from near 0 to about 100 and from 750 to about 5,000 respectively. Most commercial polyesters, that is those that have a relatively good combination of physical, chemical and electrical properties, have an acid number within the range of about 5 to about 50 and a molecular weight within the range of about 1,000 to about 3,000.

Polyesters of the type described above are prepared according to well known techniques in which substantially stoichiometric proportions of the acid and alcoholic reactants are polyesterified.

The particular unsaturated polyesters used in the practice of this invention should be selected on the basis of the properties desired in the final product. This selection can be made in accordance with known technology. Blends of two or more individual polyesters can be used to achieve the balance of properties desired. There are many types of readily available polyesters which can be made according to the present invention into beads having a good combination of physical and chemical properties which make them very suitable for use in light reflective applications.

The vinyl monomeric materials which copolymerize with and crosslink with the unsaturated polyesters are well known compounds. Examples of such compounds, which it is noted contain a $CH_2=C<$ group, are styrene, vinyl toluene, diallylphthalate, alphamethyl styrene, divinyl benzene, chlorostyrene, methyl methacrylate and the lower alkylesters of acrylic and methacrylic acids. The term vinyl as used herein is also meant to cover allylic and vinylidene type monomers since they also contain the polymerizable $CH_2=C<$ group.

The vinyl monomeric crosslinking agent used should be selected on the basis of the particular properties desired in the final product. Mixtures of two or more crosslinking agents can be used to achieve the properties desired. This selection can be made in accordance with known technology.

Cured beads made from a curable polyester resin composition that contains styrene have been found to have a good combination of properties. For applications in which it is important that the cured beads have particularly high ultraviolet stability, it is recommended that a mixture of styrene and lower alkyl acrylates or methacrylates be used as the crosslinking agent.

The curable resin composition that is polymerized in accordance with this invention should be essentially immiscible or insoluble in the aqueous suspension so that it can be formed into discrete liquid particles. In addition, the curable resin composition should be essentially inert and nonreactive with respect to the aqueous medium of the suspension. For example, the use of unsaturated polyesters which contain liable halide groups, such as alpha-haloaliphatic acids, which would tend to hydrolyze during exposure to the aqueous suspending medium should be avoided.

The proportion of unsaturated polyester and vinyl monomeric crosslinking agent comprising the curable resin composition can vary over a wide range and can be selected in accordance with known technology to provide the properties desired in the final product. For example, the curable resin composition can comprise about 10 to about 90 wt. percent of the unsaturated polyester and about 90 to about 10 wt. percent of the vinyl monomeric crosslinking agent. A curable resin containing less than about 10 wt. percent crosslinking agent tends to be too viscous to disperse readily into beads and one containing more than about 90 wt. percent crosslinking agent tends to produce beads that are relatively cloudy and of poor solvent resistance; in addition, such resins cure relatively slowly. Preferably the curable resin should comprise about 20 to about 75 wt. percent of the polyester and about 25 to about 80 wt. percent of the crosslinking agent.

When utilizing a mixture of styrene and lower alkyl acrylates or methacrylates as the crosslinking agent, it is recommended that the styrene be present in an amount within the range of about 40 to about 95 wt. percent and the alkyl acrylate or methacrylate in an amount within the range of about 5 to about 60 wt. percent. As mentioned above, the alkyl acrylate or methacrylate improves the ultraviolet stability of the beads. The higher the concentration of this type monomer the better the ultraviolet stability of the beads and the best stability can be attained by using the alkyl acrylate or methacrylate exclusively as the crosslinking agent; however, these monomers are relatively expensive and their presence reduces the chemical resistance of the beads. Thus, it is preferred to use them in combination with styrene.

To accelerate the cure of the polymerizable polyester composition, initiators or catalysts should be incorporated in the resin. Examples of such materials include t-butyl peroctoate, benzoyl peroxide, lauroyl peroxide, t-butyl peroxypivalate, and succinic acid peroxide. The catalyst should be preferably water insoluble because such catalysts, often referred to as "oil soluble" catalysts, are much more effective in accelerating cure than water soluble catalysts. The use of lauroyl peroxide is preferred; beads of excellent clarity have been prepared utilizing this catalyst.

The curing catalyst can be used in conventional amounts, for example about 0.1 to about 5% based on the weight of the polyester and crosslinking agents.

Promotors such as, for example, metal and amine promotors, can be used also to accelerate cure. Cobalt naphthenate is an example of a metal promotor and dimethylaniline is an example of an amine promotor. They can be used in conventional amounts, for example, about 0.05 to about 0.5 wt. percent of the amine promotor and about 0.003 to about 0.1 wt. percent of the metal promotor based on the weight of the polyester and crosslinking agent.

As mentioned above, polyester resin beads of improved ultraviolet stability can be prepared by utilizing a mixture of styrene and lower alkyl acrylates and/or methacrylates as the crosslinking agent. Improved ultraviolet stability can be achieved also by adding ultraviolet (UV) stabilizers to the reaction mixture. Available UV stabilizers can be used in conventional amounts. Examples of UV stabilizers are 4-dodecyloxy-2 hydroxy benzophenone and 2(2'-hydroxy-5'-methylphenyl) benzotriazole. Exemplary amounts of UV stabilizers that can be used are about 0.02 to about 1% based on the weight of polyester and crosslinking agent.

As mentioned above the method of this invention comprises suspension polymerizing a curable resin composition of an unsaturated polyester and a vinyl monomeric crosslinking agent in the presence of a water soluble salt. Suspension polymerization is also known as granular polymerization, pearl polymerization or bead polymerization. These terms are somewhat synonymous and in contrast to emulsion polymerization, bulk polymerization and solution polymerization. The practice of aqueous suspension polymerization is well known in the art. It involves suspending the monomer in water and while so suspended effecting polymerization. Heat and catalysts are employed as polymerization aids. The monomer may be maintained in a suspension state during the course of the reaction by agitation alone, however, it is preferred to stabilize the system with a suspending agent. After the polymerization is complete the polyester beads are recovered by filtration decantation, or centrifugation. The beads are then washed and dried and are then ready for use.

The suspension polymerization of the present invention must be carried out in the presence of one or more water soluble salts. The suspension polymerization of the unsaturated polyester-vinyl monomeric resin mixture in the absence of the salt yields cloudy and undesirable beads.

The amount of water soluble salt that is necessary for acceptable clarity will depend to a certain extent on the particular curable resin compositions being employed, the presence or absence of a suspending agent, the type of suspending agent and other reaction variables. However, regardless of these variables the presence of salt is critical. The salt should be present in the amount of at least about 0.5% by weight based on the weight of the aqueous suspending medium. Concentrations below about 0.5% will result in improved clarity of the resulting polyester bead. However, the beads made in the presence of this small concentration will not be as clear as necessary for reflex reflective applications. It is necessary for the salt to have a minimum concentration of at least about 0.5% by weight. It is preferable that the salt concentration be at least 1% by weight. There is no critical maximum amount of salt that can be used for improving clarity. However concentrations greater than 20% by weight will seldom if ever be needed to achieve maximum clarity. In fact there is no noticeable increase in the effectiveness of improving clarity for salt concentrations greater than 20% as compared to salt concentrations of less than 20%. In addition high salt concentrations tend to decrease the effectiveness of many of the commonly used suspending agents. For example, high salt concentrations tend to salt out suspending agents such as polyacrylamides, polyvinylalcohols, and many other suspending agents. The salt concentrations for most salts will be in the range of from 1 to 15%, therefore, this is the preferred range. It should be noted that high salt concentrations i.e. greater than 20% may be desirable for adjusting the density of the suspension medium when curable resin compositions of high density are employed.

It has been found that almost any type of salt may be used in this invention. The important factor is that the salt be soluble in water. Numerous polymerizations have been carried out using a very wide variety of different salts. The results of these suspension polymerizations clearly illustrates the effectiveness of all types of salts. However, in addition to the requisite solubility there are two additional limitations on the types of salts that are useful. First of all the salts may not react to render the suspending agent inactive if one is employed. Also the salt must be chosen so that it does not react with the curable resin composition so as to objectionably effect the properties of the suspension or the resulting cured beads. For example, it is well known that most unsaturated polyesters have acidic terminal groups. The degree of acidic terminal groups is directly related to the acid number of the unsaturated polyester. Therefore, salts which give a substantially basic reaction when dissolved in water should be avoided. Examples of some of these salts are sodium carbonate, sodium hydroxide, sodium acetate, and sodium benzoate. These bases react with the acid end groups and converts them into salts. This may result in beads of reduced clarity and/or emulsion being formed and the resulting cured particles being useless in the present invention.

While almost any water soluble salt which does not react with the curable resin composition or the suspending agent is useful there are some salts which are preferred. For example the alkaline and alkaline earth metal halides particularly chlorides are very effective. These compounds are readily available, easy to handle, nontoxic and very effective in producing clear reflex reflective beads. It is also within the scope of this invention to use mixtures of one or more different water soluble salts.

As mentioned above it is impossible to produce optimum reflex reflective beads without the presence of salt in the aqueous suspension system. The improved clarity of the resulting beads is directly atributable to the presence of the salt. In addition, the presence of the salt has another beneficial function. During the normal suspension polymerization of polyester resin-vinyl monomer mixtures (i.e. without salt) a substantial amount of water is encapsulated or emulsified in the cured polyester bead. This water produces beads having cloudy spots. When large amounts of water becomes encapsulated or emulsified the entire bead may be cloudy or light traveling through the bead is undesirably refracted and/or reflected. In addition to affecting the reflex reflectivity of the beads the entraped water also affects the strength and other properties. However, when the suspension polymerization is performed in the presence of salt as in the present invention the resulting beads are substantially free from entrapped water. In addition, the presence of salt helps to reduce the voids and other irregularities on the surfaces of the cured polyester beads.

The aqueous suspension polymerization of the present invention may be accomplished with or without a suspending agent. So long as the water soluble salt is present the resulting beads will have improved reflex reflective properties. The suspension may be maintained by agitation alone. The agitation may be accomplished by stirring, shaking, rotating, circulating pump, static mixer or any other device for agitating the suspension which is available. The bead and bead size distribution are dependent on agitation speed. In addition, a violent agitation will cause large quantities of encapsulated materials in the cured beads therefore gentle agitation conditions are preferred. However, as is realized by one of ordinary skill in the art, it is very difficult to maintain a suspension without the use of a suspending agent. The use of a suspending agent allows one to control the bead size, bead size distribution and bead shape. In addition the use of a suspending agent yields beads which have substantially less internal voids and surface irregularities when compared to beads prepared without a suspending agent. Therefore, it is preferred that the suspension polymerization be performed in the presence of a good suspending agent.

Numerous different types of suspending agents have been successfully employed in this invention. These suspending agents were both inorganic and organic, polymeric and nonpolymeric. In addition combinations of more than one suspending agent have been found to be effective. The suspending agent should be chosen so that the resulting suspension will yield beads of controlled size, controlled size distribution, substantially spherically shaped and free from surface irregularities.

Some of the useful suspending agents are natural gums, dextrans, starch, cellulose, polyacrylamide, polyvinyl alcohol, gelatin, polyacrylic acid esters, copolymers of acrylic acid esters and acrylamide, acrylic acid polymers, copolymers and salts thereof, polyethylene glycol esters, polymeric cationic quaternary ammonium compounds, tricalcium phosphate, barium sulfate, aluminum silicate and hydrated aluminum oxide. The preferred suspending agents are the organic suspending agents since they act as a protective colloid and the resulting beads are substantially spherically shaped and free from surface irregularities. Polyvinylalcohols are a very useful and are one of the more preferred suspending agents.

The amount of suspending agent used in the aqueous suspension polymerization will tend to vary depending on the particular curable resin being polymerized and the extent to which the suspension is agitated. The amount of suspending agent should be at least sufficient to maintain the liquid polyester resin particles dispersed; the maximum amount will be governed by the amount which will convert the suspension into an emulsion. Exemplary amounts of suspending agent that can be used are within the range of about 0.005 to about 5 wt. percent based on the water in the suspending medium. However, for any particular system the most effective amount of suspending agent should be determined on the basis of experience. Generally the most effective concentrations will be in the range of 0.01 to 2.0% by weight for the polymerized protective colloid type suspending agents.

The aqueous suspension containing the water soluble salt and curable resin composition of this invention can be prepared as follows. The unsaturated polyester and vinyl monomeric crosslinking agent are combined. In general, this will produce a solution in which the polyester is dissolved in the monomeric crosslinking agent. The curing catalyst is added preferably to the resulting curable resin composition. The curable resin composition can then be added to water having dissolved therein the suspending agent and the water soluble salt. The volumetric proportion of water to curable resin composition can vary over a wide range. The volume of water should be at least sufficient to provide a low viscosity readily stirrable mixture in which the exothermic curing reaction is controlled readily and should not be so high that the amount of product produced per unit of reactor volume becomes unnecessarily low. Exemplary volumetric proportions of water to curable composition are from about 3:1 to about 1:1. However, it should be understood that smaller or larger volumetric proportions can be used.

The aqueous suspension of curable polyester resin should be agitated at least to the extent that the curable composition is maintained suspended therein in discrete liquid particle form. In general, the greater the agitation, the finer will be the particle size of the curable resin and the cured beads formed therefrom. The particle size and particle size distribution can be controlled by the extent to which the reaction medium is agitated when an effective suspending agent is utilized.

As a result of the presence of the suspending agent and the agitation of the aqueous suspension, discrete spherical liquid particles of curable resin ranging in size, for example, from about 0.002 to about 0.2 inch can be produced. Cured spherical particles of polyester resin which correspond substantially in size to the uncured liquid particles are produced.

An important aspect of the present invention is that liquid particles of curable polyester resin can be cured or polymerized completely in relatively short periods of time, for example, within about 1 to about 200 minutes. Completely cured or completely polymerized polyester beads prepared in accordance with this invention can be truly thermoset, that is, they are incapable of fusing upon being subjected to heat.

In preparing the cured beads in a relatively short period of time, as described above, certain procedures should be followed. As mentioned above, a curing catalyst should be included in the curable resin. In addition, the reaction should be carried out at elevated temperatures within the range of about 60° C. up to the boiling point of the aqueous suspension, that is about 100° C. Higher temperatures can be used if the suspension polymerization is carried out under pressure. When utilizing promotors, temperatures within the range of room temperature or even lower can be used to cure the particles within about 30 minutes to about 2 hours.

Also, the reaction should be conducted in an oxygen-free atmosphere. The presence of oxygen particularly retards the final stages of curing resulting in high residual monomer levels unless prolonged reaction periods are employed. The oxygen free atmosphere can be accomplished by conducting the reaction under a blanket of inert gas, such as for example, carbon dioxide or nitrogen. Increased reaction rates can be obtained also by removing dissolved oxygen from the aqueous medium. This can be done conveniently by heating the aqueous medium at reflux and purging with inert gas such as nitrogen prior to adding the curable resin thereto.

The pH of the reaction medium should be maintained within the range of about 2 to about 8. At pH above 8, there is a tendency for the suspension to convert to an emulsion. Below a pH of about 2, relatively cloudy beads are obtained in some cases.

After the liquid curable polyester resin particles have been polymerized or cured, the reaction mixture can be cooled and the cured beads can be separated from the aqueous medium, for example, by filtering. The cured particles can then be washed, preferably with water, to remove any salt or suspending agent which remains on the surface of the beads. Optionally, additional water can be charged to the reaction medium after the cured particles have been formed and prior to cooling the reaction medium. It has been found that by charging additional water to the reaction medium, the cloudy suspending medium can be more readily removed from the cured particles. This sometimes improves the clarity of the particles. The amount of additional water charged will generally be about 20 to about 100% of the volume of the suspending medium.

After the particles are separated from the aqueous medium, additional suspending agent and water soluble salt can be added thereto to restore the concentrations of these materials to their desired levels. In addition, it may be necessary to adjust the pH to its desired range. Curable resin compositions can then be added and converted into cured particles.

The beads can be dried conveniently in an oven after they are separated from the aqueous medium. If a drying oven is used, it can be advantageous to also use it to completely cure particles which are not allowed to completely cure in the reaction medium; such particles can be removed from the reaction medium prior to being cured fully, thereby cutting down on reaction time.

Although the cured polyester resin beads produced in accordance with this invention can be used as an insulating medium or as propping agents or as fillers for thermoplastics and thermosetting polymers, it is believed that their widest application of use will be in reflex reflective light applications. Examples of such applications include the use of the beads in combination with a light reflective paint applied to trafficways such as highways, airport runways and parking ramps and in highway safety and traffic control signs.

As will be seen from the examples reported hereinbelow, the process described herein can be used to prepare spherical particles or beads which are very clear and suitable for use in reflex reflective light applications of the exemplary types mentioned above. The term "clear," as used herein, means free of a milky or cloudy appearance and substantially free of white or colored particles. The invention can be used to prepare batches of cured polyester resin particles substantially all of which are clear and spherical or which contain only a very small and insignificant amount, for example less than about 5% of particles which are not clear and spherical. The size distribution of these beads is controllable. As will be seen also from the examples reported below, the present invention can be used to prepare cured polyester resin beads which are substantially free (i.e. less than 5%) of voids and entrapped gas bubbles or water and surface scratches on irregularities. Such clear beads have excellent reflex reflective properties over a wide range of angles of illumination varying from less than 1° to about 90° and are thus suited for use in a variety of reflex reflective light applications.

For use in combination with traffic marking paints, the cured polyester resin beads can be predispersed in the paint which is then applied as stripes to the center or edges of the roadway or the cured polyester resin beads can be sprinkled onto paint strips immediately after the paint is applied. Thus applied, the beads are partially embedded in the paint and the exposed top portion of the beads, uncoated by the paint, provides a ready made reflex reflective medium. On the other hand, traffic marking paints containing dispersed glass beads are also commercial items. When applied, these paints have poor reflex reflectivity until the paint covering the upper surface of the beads is worn away. The high density of the glass beads leads to rapid settling in the paint before application.

For use in applications where the beads are predispersed in a light reflective paint, the beads should preferably have a diameter of about 0.002 to about 0.05". For advantageous use in applications where the beads are applied to a light reflective paint before the paint dries, the beads should preferably have a diameter of about 0.003 to about 0.05". Cured polyester resin beads or spheres of such sizes can be prepared in accordance with the present invention. For exemplary purposes there is set forth in Table A below the specifications respecting the bead size and the bead size distribution for beads which are accepted for use by the Pennsylvania Highway Department in combination with traffic marking paints. The present invention can be utilized to prepare cured polyester resin beads or spheres of such sizes directly from the polymerization process without the need for additional steps such as screening.

TABLE A

Bead Size Distribution

| U.S. Standard Sieve Series No.: | Wt. Percent Passing |
|---|---|
| 16 | 100 |
| 20 | 98–100 |
| 30 | 70–90 |
| 50 | 20–40 |
| 100 | 0–5 |
| 200 | 0–1 |

The above specifications respecting bead or sphere size distribution are typical of those adopted by other states. It is noted that the sieve openings for the above sieve series Nos. (16–200) are about 0.05 to about 0.003" respectively. Thus, beads with diameters ranging from about 0.003 to about 0.05" may be used satisfactorily.

For effective use reflex reflective beads should have a variety of other properties, the identities and values of which will tend to vary depending on the specific reflex reflective application in which the beads are used. For example, in utilizing beads in combination with highway marking paints, the following properties are usually considered to be important: refractive index; density; crush resistance; chemical stability; UV stability; and moisture resistance.

In accordance with this invention, cured polyester resin beads having the aforementioned properties can be prepared. More specifically, cured polyester resin beads in accordance with this invention can be prepared having a refractive index within the range of about 1.5 to about 1.7; and a density within the range of about 1.1 to about 1.8. As will be seen from the examples reported below, cured polyester resin beads of this invention having good crush resistance, chemical stability, ultraviolet stability and moisture resistance can be prepared also.

Cured polyester resin beads which have particularly good properties for use in combination with highway marking paints can be prepared by polymerizing a curable resin comprising about 20 to about 75 wt. percent of a polyester prepared by reacting dipropylene glycol with maleic anhydride, and about 25 to about 80 wt. percent of styrene. The polymerization is effected in water (about 1 to 3 times the weight of the resin) containing about 0.02 to about 0.2 wt. percent polyvinyl alcohol and about 0.5 to about 15 wt. percent of sodium chloride.

Numerous experiments have been performed to demonstrate the effectiveness of this invention. The following are examples of some of these experiments. They should be construed to illustrate the invention but not to limit the same.

Unless otherwise stated, the cured polyester resin beads of the examples were prepared utilizing the following equipment and procedure. The equipment included a 500 ml. round bottom flask equipped with a paddle type stirrer, thermometer, reflux condenser and means for maintaining a nitrogen atmosphere. There was added to the flask 200 ml. of distilled water and the water soluble salt. Dissolved air in the water was removed by heating at reflux and purging with nitrogen and a nitrogen atmosphere maintained during the remainder of the reaction. Thereafter, the water was cooled to 70° C. The suspending agent, when used, and 100 g. of the curable composition containing a catalyst were added to the water without stirring. The aqueous composition was then stirred to the desired level and liquid particles of the curable composition were formed and dispersed in the aqueous medium. This aqueous suspension was heated by electric mantel to cure the liquid particles. After the particles were cured, the reaction mixture was cooled to 50° C. or less and the particles were separated and washed with distilled water by decantation and filtration. The cured particles were spread in a thin layer and air-dried overnight at room temperature.

The first group of examples reported in Table 1 below shows that cured polyester resin beads of improved clarity can be prepared by utilizing a water soluble salt such as sodium chloride in the reaction mixture. The examples show also that the beads can be prepared in accordance with this invention in a relatively short period of time, for example, less than 1 hour. The curable resin comprised 60 wt. percent styrene and 40 wt. percent of an unsaturated polyester having an acid number of about 30 and a molecular weight of about 1500 and prepared by reacting propylene glycol, dipropylene glycol, isophthalic acid and maleic anhydride in molar proportions of 1.73/0.84/1/1.4 respectively. The curing catalyst was t-butyl peroctoate in an amount of 1 part/100 parts of the curable resin. A suspending agent of polyvinyl alcohol (Elvanol 50–42) was present in an amount of 0.1 part/100 parts of water. The reaction mixture was stirred at the rate of 220 r.p.m. The amounts of NaCl and the curing or heating conditions used are set forth in the table.

TABLE 1

| Example number | Amount of NaCl, parts/100 parts water | Bead clarity rating |
|---|---|---|
| 1 | 0 | >10 |
| 2 | 1 | 2–3 |
| 2a | 2 | 2 |
| 2b | 5 | 2 |
| 3 | 10 | 2 |

The clarity of the cured beads was examined with a microscope. The beads were assigned relative clarity values ranging from 2 to 10. This rating system is discussed later herein.

With reference to Table 1 above, the cloudy beads Example 1, prepared in the absence of NaCl, appeared milky and were not transparent when viewed under a microscope. However, those of Examples 2 and 3, prepared in the presence of NaCl, were almost completely transparent when viewed under the microscope. The cured resin particles of Examples 2 and 3 ranged in size from about 30 to about 100 mesh and appeared to be perfect spheres when viewed under a microscope.

The next group of examples in Table 2 below shows the preparation of clear thermoset polyester resin beads prepared in reaction media that contained varying amounts of polyvinyl alcohol, suspending agent and NaCl in an amount of 10 parts/100 parts of water. The curable resin comprised 60 wt. percent styrene and 40 wt. percent of the unsaturated polyester used in Example Nos. 1–3. The catalyst was t-butyl peroctoate in an amount of 1 part/100 parts of the curable resin.

D 60 wt. percent styrene and 40 wt. percent of the unsaturated polyester of "C" above;

E 36 wt. percent styrene and 64 wt. percent of an unsaturated polyester prepared by reacting propoxylated bis-

TABLE 2

| Example number | Amt. of polyvinyl alcohol, parts/ 100 parts of water | Stirring rate, r.p.m. | Heating conditions, time in min. | | | Description of cured beads |
|---|---|---|---|---|---|---|
| | | | 60-75° C. | 75-90° C. | 90-98° C. | |
| 4 | 0.01 | 200 | 6 | 33 | 12 | Light clumping, clear beads. |
| 5 | 0.025 | 220 | 6 | 18 | 5 | No clumping, clear beads. |
| 6 | 0.05 | 220 | 6 | 14 | 16 | Light clumping, clear beads. |
| 7 | 0.1 | 220 | 5 | 16 | 10 | No clumping, clear beads. |
| 8 | 0.1 | 220 | 5 | 25 | 15 | Do. |
| 9 | 0.2 | 200 | 4 | 18 | 35 | Do. |

The beads of Examples 4–9 above were nearly free of agglomerated beads and were free of cloudiness. For the curable resin used in these examples, relatively small amounts of polyvinyl alcohol were effective in maintainphenol A, propoxylated tetrabromobisphenol A and either fumaric acid or maleic anhydride. (This is a commercial product sold as Atlac 711 by Atlas Chemical Co. The exact proportion of reactants is unknown.)

TABLE 3

| Example number | Curable resin | Amounts in parts/ 100 parts of water | | Stirring rate, r.p.m. | Heating conditions, time in min. | | | Bead size, wt. percent passing Screen No.— | | | | | | |
|---|---|---|---|---|---|---|---|---|---|---|---|---|---|---|
| | | Polyvinyl alcohol | NaCl | | 60-75° C. | 75-90° C. | 90-98° C. | 14 | 20 | 30 | 40 | 60 | 100 | 120 |
| 10 | A | 0.1 | 5 | 130 | 2 | 6 | 60 | | 72 | 29 | | 1 | | |
| 11 | B | 0.1 | 5 | 160 | 3 | 5 | 60 | | 92 | 46 | | 1 | | |
| 12 | C | 0.1 | 5 | 112 | 7 | 17 | 20 | 40 | | | | | | |
| 3 | C | 0.1 | 5 | 140 | 4 | 10 | 13 | 65 | | 13 | | | | |
| 14 | D | 0.1 | 5 | 180 | 4 | 16 | 22 | | | 99 | | <1 | | |
| 15 | D | 0.1 | 10 | 240 | 5 | 16 | 19 | | | 93 | | 2 | | |
| 16 | D | 0.1 | 10 | 200 | 4 | 18 | 35 | | | | 93 | <1 | | |
| 17 | D | 0.2 | 5 | ¹370 | 6 | 8 | 45 | | | | | 100 | 11 | 1 |
| 18 | E | 0.2 | 5 | ¹370 | 4 | 20 | 30 | | | | | 100 | 2 | |

¹ The beads of these examples were prepared in a Morton flask, the walls of which are symmetrically creased in 4 places, as distinguished from the round bottom flask that was used for preparing the beads of other examples.

ing stable suspensions. The beads ranged in size from about 40 to about 120 mesh and were perfectly spherical under microscopic examination. It is noted that the total curing times for the beads ranged from 29 to 57 minutes. The purpose of curing the beads progressively at higher temperatures was to facilitate control of the exothermic reaction which without control would go to reflux. Reflux during early stages of cure has been found to increase cloudiness.

As mentioned hereinabove, the size and distribution of sizes of cured beads produced will tend to vary depending on the curable resin used, the viscosity thereof, the rate at which the reaction medium is stirred, the suspending agent employed, etc. The examples in Table 3 below illustrate the preparation of various sizes of cured beads from different curable resins and under different reaction conditions. (In all of the examples herein, the screen No. refers to U.S. Standard Sieve Series.) The curing catalyst was t-butyl peroctoate in an amount of 1 part/100 parts of curable resin and the curable resins used in the Examples of Table 3 were as follows:

A 70 wt. percent styrene and 30 wt. percent of an unsaturated polyester prepared by reacting propylene glycol, phthalic anhydride and maleic anhydride in a molar ratio of 3/2/1 respectively;

B 70 wt. percent styrene and 30 wt. percent of an unsaturated polyester prepared by reacting the reactants of "A" above, but in a molar ratio of 3/1/2 respectively;

C 22 wt. percent styrene and 78 wt. percent of an unsaturated polyester prepared by reacting propylene glycol, dipropylene glycol, isophthalic acid and maleic anhydride in a molar ratio of 1.73/0.84/1/1.40 respectively;

Examples of bead sizes that can be produced in accordance with the present invention are illustrated in Table 3 above. Comparison of the beads of Examples 12 and 13 shows that smaller beads are produced by increasing the rate of stirring for this system. A comparison of the beads of Examples 13 and 14 shows that the beads of Example 13 are larger than those of Example 14. The beads of these examples were prepared from the same curable resins except that the resin of Example 13 contained less styrene, and therefore, was more viscous (the curable resin C of Example 13 had a viscosity of 160 poises and the curable resin D of Example 14 had a viscosity of 2 poises). Other factors being equal, the higher the viscosity of the curable resin, the larger the bead size. It is noted that the curable resin of Examples 15 and 16 had a density very close to the density of the NaCl solution. This permits the formation of stable suspensions at low stirring rates. The use of the Morton flask in preparing the beads of Examples 17 and 18 permitted the rate of stirring to be increased without giving a splashing action or without giving a pronounced vortex which exposes a significant portion of the stirring paddle. Splashing type stirring produces beads containing gas bubbles and entrapped water; this is not desirable for beads which are to be used in reflex reflective applications. It can be seen that control of variables such as, for example, those described above can be exercised to produce cured beads within a desired range of sizes.

As set forth hereinabove, the use of a water soluble salt such as sodium chloride is critical for producing cured polyester resin beads of improved clarity. The use of the suspending agent facilitates the control of bead size, bead shape, bead size distribution and the like. The next group of examples reported in Table 4 below illustrates the use of different curable resins and the extent to which the cured thermoset particles produced from these resins can vary in clarity depending on the amount of vinyl monomer that is employed with the different polyesters.

In preparing the cured beads of the examples in Table 4 below, 0.2 g. of polyvinyl alcohol and 10 g. of sodium chloride were added, with stirring, to 200 ml. of water contained in the reaction flask, after which the water was heated to a reflux and swept with nitrogen to remove all air. (A nitrogen atmosphere was maintained throughout the reaction.) Thereafter, the aqueous medium was cooled to 70° C. for 3–10 minutes. The temperature was maintained for 1 hour at 75–80° C., for 0.5 hour at 87–91° C. and at 95–98° C. for 0.25 hour. The contents of the flask were cooled rapidly to about 30° C. and the cured beads were then poured on a No. 325 sieve. The beads were reslurried in water, filtered on a sintered glass funnel, allowed to dry overnight and dried finally in an oven at 65–70° C. for several hours.

The clarity of the cured beads was examined with a microscope. The beads were assigned relative clarity values ranging between 2 and 10. A clarity rating of 2 was assigned to those beads which contained only a barely discernible level of cloudiness or specks; and a clarity rating of 10 was assigned to those beads which were completely milky white in appearance. Beads varying in clarity between these two degrees were rated accordingly. For use in most commercial reflex reflective applications, beads having a clarity rating of no greater than about 4 are desirable.

There is set forth in Table 4 also the yields of beads produced, that is, the percent of beads produced based on the resin charged to the reactor, and the reactor, and the pH's of the suspending mixtures measured at room temperature after the reactions were terminated.

TABLE 4

| Ex. No. | Poly- ester | Curable resin Amount of poly- ester, wt. percent | Styrene, wt. percent | Stirrer speed, r.p.m. | Final pH | Yield, percent | Clarity rating |
|---|---|---|---|---|---|---|---|
| 19 | PE [1] | 50 | 50 | 280 | 2.3 | 98 | 4 |
| 20 | PE [1] | 30 | 70 | 280–288 | 2.4 | 98 | 7 |
| 21 | PE [1] | 10 | 90 | 290–284 | 2.7 | 89 | 6 |
| 22 | PE [2] | 50 | 50 | 276 | 2.5 | 98 | 2 |
| 23 | PE [2] | 30 | 70 | 284 | 2.55 | 99 | 5 |
| 24 | PE [2] | 10 | 90 | 280 | 2.8 | 97 | 10 |
| 25 | PE [3] | 50 | 50 | 284 | 2.5 | 98 | 3 |
| 26 | PE [3] | 30 | 70 | 279–280 | 2.6 | 98 | 9 |
| 27 | PE [3] | 10 | 90 | 280 | 2.8 | 95 | 10 |
| 28 | PE [4] | 50 | 50 | 276 | 3.1 | 99 | 2 |
| 29 | PE [4] | 30 | 70 | 280–292 | 3.2 | 98 | 2 |
| 30 | PE [4] | 30 | 70 | 180 | | 96 | 2 |
| 31 | PE [4] | 10 | 90 | 276 | 3.7 | 99 | 6 |

[1] Polyester prepared by reacting propylene glycol, phthalic anhydride and maleic anhydride in molar ratios of 3/2/1.
[2] Polyester prepared by reacting the reactants of (1) above, but in molar ratios of 2/1/1.
[3] Polyester prepared by reacting the reactants of (1) above but in molar ratios of 3/1/2.
[4] Polyester prepared by reacting dipropylene glycol and maleic anhydride in equimolar amounts.

From the examples reported in Table 4 above, it can be seen that generally, the clarity of those beads made from the curable resins that had lower proportions of styrene was better than those made from the resins that contained higher proportions of styrene. It was observed also that the cured beads prepared from the curable resins that had lower proportions of styrene tended to be smoother and more uniformly shaped in the form of perfect spheres, as viewed under a microscope, than those made from the resins that contained the higher proportions of styrene. The percents of beads which agglomerated for all of the examples were relatively small, ranging from about 1 to about 10 wt. percent depending on the curable resin used, except for Example No. 21 in which 50–70 wt. percent of the beads were agglomerated; this was attributed to the extremely high level of styrene in the resin and the low levels of fumarate unsaturation in the polyester. It is believed that better results with this resin formulation would be obtained if the reaction conditions were modified somewhat, for example by increasing the concentration of the suspending agent.

As a further illustration of sizes of beads that can be prepared in accordance with this invention, there is set forth below the size distribution of the beads of Examples Nos. 28, 29 and 31.

| Beads of Example No. | Wt. percent passing screen No.— | | | | |
|---|---|---|---|---|---|
| | 14 | 20 | 30 | 50 | 100 |
| 28 | 100 | 98.5 | 98 | 17 | 1.6 |
| 29 | 100 | 99.5 | 98.5 | 58 | 2 |
| 31 | 100 | 100 | 98.5 | 40 | 1.7 |

The examples in Table 5 below show the preparation of cured beads from a suspension polymerization reaction mixture that contained also a UV stabilizer. Compared to the previous examples, larger quantities of reactants were used in the examples of Table 5. The reaction was carried out in a 5 liter 3-neck flask equipped with a paddle stirrer, thermometer, and condenser. An amount of water which was twice that of the curable resin was added to the flask along with 0.1 part and 5 parts/100 parts based on the water of a polyvinyl alcohol suspending agent and sodium chloride respectively. The UV stabilizer identified in Table 5 was added to the curable resin composition. The aqueous medium was heated to reflux with stirring and swept with nitrogen to remove all air. (A nitrogen atmosphere was maintained throughout the reaction.) The aqueous medium was cooled to 70° C., stirring was terminated and the amount of curable resin identified in Table 5 below was charged to the flask. The curable resin contained 70 wt. percent styrene and 30 wt. percent of an unsaturated polyester prepared by reacting equimolar amounts of dipropylene glycol with maleic anhydride; in addition, the curable resin contained 1.0 part/100 parts based on the curable resin of lauroyl peroxide. The reaction mixture was stirred and heated to 75° C. for 1 hour with a water bath which was used to control the initial exotherm. Thereafter the reaction mixture was maintained at 87–91° C. for 0.5 hour and then at 95–98° C. for 0.25 hour. The reaction mixture was cooled to about 30° C. and poured on a No. 325 sieve. The cured beads were reslurried in water, filtered on a sintered glass funnel, allowed to dry overnight and then dried in an oven at 60–75° C. for several hours.

| Example number | Curable resin, g. | UV stabilizer and amt. in parts/100 parts of resin | Speed, r.p.m. | Percent yield | Clarity |
|---|---|---|---|---|---|
| 32 | 1,000 | None | 176 | 98 | 2 |
| 33 | 1,250 | DOBP/0.25 [1] | 160 | 98 | 2 |
| 34 | 1,250 | DOBP/0.5 [1] | 176 | 98 | 2 |
| 35 | 1,250 | TP/0.25 [2] | 156 | 98 | 2 |
| 36 | 1,250 | TP/0.5 [2] | 132 | 99 | 2 |

[1] 4-dodecyloxy-2-hydroxybenzophenone (sold by Eastman Chemical Products, Inc. as DOBP).
[2] 2-(2-hydroxy-5 methylphenyl) benzotriazole (sold by Geigy Chemical Corp. as Tinuvin P).

The cured beads of Example Nos. 32–36 were subjected to accelerated UV stability tests. If was observed that the beads of Example Nos. 34 and 36 had the best UV stability and that those of Example Nos. 33 and 35 had better UV stability than the beads of Example No. 32. Although all of the beads had excellent clarity and were assigned a clarity rating of 2, it was observed that about 10% of the beads of Example Nos. 33 and 34 were somewhat less clear than the rest of the beads and these were assigned a clarity rating of 2–4. Similarly, about 5% of the beads of Examples Nos. 35 and 36 were assigned a clarity rating of 2–4.

Beads of Examples 32–36 were tested for chemical stability by subjecting them for one week periods to 3N $H_2SO_4$, 0.25N NaOH, 0.25N HCl, water, 1M $CaCl_2$, and 50% $Na_2S$. The test evaluations showed no decomposition, change in color, surface etching, dulling, or other adverse change. On the other hand, glass beads in the presence of 0.25N NaOH and 50% $Na_2S$ were found to have undergone a reduction in clarity, substantial surface etching and an increase in color.

Example No. 37 below shows the preparation of clear cured polyester resin beads from a curable resin which contains, as a crosslinking agent, a mixture of styrene and methyl methacrylate.

Example No. 37

The beads of this example were prepared from a curable resin which was the same as that of Example No. 32 except that equal weights of styrene and methyl methacrylate were used. The amounts of Polyvinyl alcohol, NaCl and lauroyl peroxide curing catalyst were the same as those used in Example No. 32. The suspension polymerization of the curable resin was carried out under conditions which were essentially identical with those of Example No. 32.

All of the beads of Example No. 37 had excellent clarity and were assigned a clarity rating of 2. Upon subjecting the beads of Example 37 to an accelerated UV stability test, it was found that they were even more stable than the beads of Examples 34 and 36 of Table 5. Testing showed that the beads of Example No. 37 had better crush resistance than those of Example No. 32.

The refractive indices of Example Nos. 32 and 37 were measured before and after accelerated UV stability tests. After 7 days exposure to the test, it was found that the refractive index of the beads of Example No. 32 was the same as that before the test, namely 1.56. After 24 days exposure to the test, the beads of Example No. 37 had a refractive index of 1.53, which was the same as its pre-test value.

The beads of Example No. 35 having a refractive index of 1.56 were water-proofed with a mixture of dimethyl dichlorosilane and trimethyl chlorosilane; (sold by General Electric Co. as Dri-Film SC–77). The water-proofed beads had a refractive index of 1.56. It was found also that water-proofing the beads had little or no adverse affect on the UV stability of the beads.

Different sets of samples of conventionally used glass beads and cured clear polyester resin beads of this invention were applied to a white traffic marking paint for the purpose of comparing various properties of the beads. The following procedure was used. A coating of conventional white, traffic marking paint, 2 mils in thickness and 2" wide was applied to a 4" x 12" glass panel which had been sprayed previously with a base coat of the white paint to provide a near opaque background. Immediately after the application of the 2" strip of paint, beads were sprinkled on it. After removing excess beads by inverting the glass panel, the test samples were placed in an oven having a temperature of 50° C. for 0.5 hours to accelerate drying. Loose beads were removed by lightly brushing the surface. A monolayer of closely packed beads adhered to the white paint strip was produced.

The polyester resin beads applied to the paint strip were those of Example No. 32 in Table 5 above. The glass beads utilized on the other set of paint strips were obtained from the Pennsylvania Highway Department and are typical of glass beads employed with traffic marking paints. Testing of the reflex reflectivity properties of the glass and polyester resin beads of the paint strips showed that the latter were substantially more reflectant than the former over a wide range of angles of illumination. By way of example, it is noted that the reflectivity of the polyester resin beads at an angle of illumination of 3° was approximately 20% greater than that of the glass beads.

Additional test specimens having the glass beads and polyester resin beads on strips of white traffic marking paint as described above were exposed to outdoor weather conditions for a 3 month period to determine relative weatherability and reflex reflectivity properties after outdoor exposure. This series of tests included also an evaluation of the cured polyester resin beads of Example Nos. 33–37. At the end of the 3 month test period, it was found that although the resistance to yellowing of the glass beads was generally better than that of the cured polyester beads, the reflex reflectivity properties of the polyester beads were in general better than those of the glass beads. It is noted also that the resistance to yellowing of the glass beads was only slightly better than the polyester beads containing the UV stabilizer (Examples 33–36). Of the different polyester beads tested, those of No. 33–36 which contained the UV stabilizers and of Example No. 37 which included methyl methacrylate as a crosslinking agent resisted yellowing better than those of Example 32 which contained no UV stabilizer and which contained styrene only as the crosslinking agent.

A series of experiments were performed which demonstrate the need for salt in order to make beads of improved clarity via suspension polymerization. In addition, the experiments demonstrate the effectiveness of the salt in preventing encapsulation of water and irregularities of the bead surfaces. The experiment also illustrates that all different types of water soluble salts are effective. The results of the series of experiments are illustrated in Table 6 below.

The unsaturated polyester-vinyl monomer resin composition was (a) 30% of an unsaturated polyester prepared by reacting dipropylene glycol and maleic anhydride in approximately equal molar amounts and having an acid number of about 8 and a molecular weight of about 1200 and (b) 70% styrene. A polyvinyl alcohol suspending agent was employed at a concentration of 0.1 parts per hundred. A lauroyl peroxide catalyst was employed at a concentration of 1% based on the curable resin composition. The procedure employed was similar to that described for Example 1 above. The suspension was stirred at a rate of about 220 r.p.m.

TABLE 6

| Example number | Salt | Salt conc., p.h.r. | Bead clarity | Percent of beads having irreg. shape | Percent of beads containing encapsulated matter | Bead surface characteristics |
|---|---|---|---|---|---|---|
| 38 | None | | >10 | 1-5 | 5-10 | Fair-good. |
| 39 | NaCl | 5 | 2– | <1 | <1 | Excellent. |
| 40 | KCl | 8 | 2– | <1 | <1 | Do. |
| 41 | CaCl$_2$ | 8 | 2-2+ | 1-5 | <1 | Good. |
| 42 | MgCl$_2$ | 8 | 2 | <1 | <1 | Excellent. |
| 43 | BaCl$_2$ | 8 | 2-2+ | <1 | <1 | Do. |
| 44 | NH$_4$Cl | 8 | 2 | <1 | <1 | Good. |
| 45 | LiCl | 5 | 3-4 | <1 | 1-5 | Poor. |
| 46 | LiCl | 8 | 3 | <1 | 1-5 | Do. |
| 47 | MnCl$_2$ | 8 | 2– | 1-5 | 1-5 | Excellent. |
| 48 | CuCl$_2$ | 8 | 2 | 1-5 | 1-5 | Do. |
| 49 | NaBr | 8 | 2– | 1-5 | 1-5 | Do. |
| 50 | MgBr$_2$ | 8 | 3-4 | 1-5 | 1-5 | Poor. |
| 51 | NaNO$_3$ | 8 | 2+ | 1-5 | 1-5 | Fair. |
| 52 | NaNO$_3$ | 7 | 2-3 | 1-5 | <1 | Good. |
| 53 | NaNO$_3$ | 7 | 2+ | 1-5 | <1 | Do. |
| 54 | NaNO$_3$ | 5 | 2+ | 1-5 | 1-5 | Do. |
| 55 | Na$_2$SO$_4$ | 5 | 3+ | 1-5 | 1-5 | Poor. |
| 56 | Na$_2$SO$_4$ | 1 | 3 | 1-5 | 1-5 | Good. |
| 57 | AlCl$_3$ | 8 | 5 | 1-5 | <1 | Poor. |

TABLE 6—Continued

| Example number | Salt | Salt conc., p.h.r. | Bead clarity | Percent of beads having irreg. Shape | Percent of beads containing encapsulated matter | Bead surface characteristics |
|---|---|---|---|---|---|---|
| 58 | Cu(NO₃)₂ | 8 | 3-4 | 1-5 | 1-5 | Good. |
| 59 | Potassium acid phthalate | 5 | >10 | 1-5 | >50 | Poor. |
| 60 | KCNS | 5 | 5 | <1 | 5-10 | Good. |
| 61 | NaOAc | 8 | >10 | 1-5 | >50 | Do. |
| 62 | Sodium maleate | 5 | >10 | >50 | >50 | Poor. |
| 63 | NaOOCCCl₃ | 8 | 2+ | 1-5 | 1-5 | Do. |

As can be seen from Table 6 the presence of a water soluble salt is critical in order to obtain beads having improved clarity. When the suspension polymerization is performed under similar conditions but without the water soluble salt the resulting cured beads are very cloudy and unacceptable. However, when salt is used a dramatic improvement in the clarity results. All of the usable salts gave greatly improved clarity and most of the salts gave beads of excellent reflex reflective clarity (2 to 3). In addition the salts also help reduce the amount of encapsulated matter in the cured bead and some of the salts affect bead shape and bead surface characteristics. Beads containing less than 10% irregular shaped beads and less than 10% encapsulated matter are desirable. However, some salts are more effective than others for controlling encapsulation and surface characteristics. Nevertheless the most critical factor is bead clarity.

In addition Table 6 illustrates that some care must be taken in selecting the salt which does not react with the polyester. A salt which gives a substantially basic reaction dissolved in water should be avoided. Such salts convert the acid end groups of the unsaturated polyester into salt end groups. This results in destroying the suspension mechanism and the resulting cured beads are cloudy, irregular shaped and contain high concentrations of encapsulated water. This is illustrated by Examples 59, 60 and 61 from Table 6. It should also be remembered that the salt should not react with the suspending agent if one is used.

A series of experiments were performed which demonstrate that a variety of suspending agents are suitable in the suspension polymerization process of this invention. The results of this series are illustrated in Table 7 below.

out for all of the various suspending agents. However, the use of a suspending agent improves the bead characteristics and one skilled in the art may easily determine the optimum use of the various suspending agents.

In Table 7 above, CMC is carboxymethyl cellulose; HEC is hydroxyethyl cellulose; MAc/A is a copolymer of 80% acrylamide and 60% methylacrylate; MMAc/A is a copolymer of 90% acrylamide and 10% methylmethacrylate; TCP is tricalcium phosphate and ASP 400 and 600 are commercially available alumina silicate powders.

A series of experiments were performed which demonstrate that various resins and monomers at various ratios can be effectively utilized in preparing clear reflex reflective polyester beads when the suspension polymerization is carried out in accordance with this invention. The results are illustrated in Table 8 and the resins used were as follows:

Example 82

70% styrene and 30% of an unsaturated polyester prepared by reacting dipropylene glycol and maleic anhydride in a molar ratio of about 1/1. The suspension polymerization was run with 0.1% PVA suspending agent and 10% NaCl.

Example 83

40% styrene and 50/ of an unsaturated polyester resin as in Example 82. The reaction conditions were the same as in Example 82.

Example 84

30% styrene and 78% of an unsaturated polyester resin as in Example 82. The reaction conditions were the same as in Example 82.

TABLE 7

| Example number | Suspending agent | Conc., p.h.r. | Salt | Salt Conc., p.h.r. | Bead clarity | Percent of beads having irreg. shape | Percent of beads containing encapsulated matter | Surface characteristics |
|---|---|---|---|---|---|---|---|---|
| 64 | PVA | 0-1 | None | | >10 | 1-5 | 5-10 | Fair. |
| 65 | None | | do | | (Too poor to be measured) | | | |
| 66 | do | | NaCl | 10 | 4 | >25 | >50 | Poor. |
| 67 | Starch | 1.0 | None | | 4 | 10-25 | 5-10 | Do. |
| 68 | do | 1.0 | KCl | 8 | 2 | 10-25 | 1-5 | Excellent. |
| 69 | CMC | 0.25 | MgCl₂ | 8 | 2+ | 10-25 | 5-10 | Poor. |
| 70 | CMC | 0.75 | MgCl₂ | 8 | 2 | 1-5 | 1-5 | Good. |
| 71 | CMC | 0.75 | None | | >10 | (Hollow beads) | | |
| 72 | HEC | 0.5 | NaCl | 5 | 2 | 5-10 | 1-5 | Good. |
| 73 | MAc/A | 0.625 | NaCl | 5 | 2 | 1-5 | 1-5 | Excellent. |
| 74 | MAc/A | 1.56 | NaCl | 5 | 2 | 1-5 | 1-5 | Do. |
| 75 | MMAc/A | 0.2 | NaCl | 5 | 2 | 1-5 | <1 | Good. |
| 76 | MMAc/A | 0.2 | None | | 6 | 5-10 | 5-10 | Do. |
| 77 | TCP | 1.0 | NaCl | 5 | 5 | >25 | | Poor. |
| 78 | TCP | 1.0 | None | | >10 | >25 | | Do. |
| 79 | ASP600 | 1.0 | NaBr | 8 | 4 | | | |
| 80 | ASP400 | 1.0 | NaCl | 5 | 2 | 1-5 | 1-5 | Good. |
| 81 | BaSO₄ | 1.0 | NaCl | 5 | 2 | 1-5 | 1-5 | Do. |

The results in Table 7 once again clearly shows the criticality of having salt present. In the absence of salt unacceptable beads are produced. In addition the results also illustrate why a suspending agent is preferred. Without a suspending agent the resulting beads are very irregularly shaped (not spherical and clumped together), have poor surface characteristics and large amounts of encapsulated water. The use of a suspending agent greatly improves the characteristics of the resulting cured beads. It should be noted with respect to the results shown in Table 7 that the optimum concentrations, stirring speed, temperature and other operational variables were not worked Example 85

50% styrene and 50% of an unsaturated polyester resin prepared by reacting propylene glycol, phthalic anhydride and maleic anhydride in an approximate molar ratio of about 2.1/1.0/1.0. The suspension polymerization was run with 0.1% PVA and 10% NaCl.

Example 86

50% styrene and 50% of an unsaturated polyester prepared by reacting propoxylated bisphenol A and maleic anhydride in approximate equal molar ratios. (This is a commercial product sold as Atlac 382 by Atlas Chemical Co. The exact proportions of reactants is unknown). The suspension polymerization was run with 0.1% PVA and 10% NaCl.

Example 87

50% styrene and 50% of an unsaturated polyester containing propoxylated tetrabromobis-phenol A and maleic anhydride in approximately equal molar ratios. (This is a commercial product sold by Atlas Chemical Co. as Atlac 711. The exact proportion of reactants is unknown.) The suspension polymerization was run with 0.1% PVA and 10% NaCl.

Example 88

70% styrene and 30% of an unsaturated polyester resin prepared by reacting propylene glycol, dipropylene glycol, isophthalic acid and maleic anhydride in a molar ratio of about 1.7/.85/1.0/1.4. The suspension polymerization was run with 0.1% PVA and 10% NaCl.

Example 89

50% styrene and 50% of an unsaturated polyester resin prepared by reacting propylene glycol phthalic anhydride, and maleic anhydride in molar ratio of about 3.3/2.0/1.0. The suspension polymerization was run with 0.1% PVA and 10% NaCl.

Example 90

Same as in Example 89 except the unsaturated polyester had a molar ratio of about 3.1/1.0/2.0.

Example 91

50% vinyl toluene and 50% of an unsaturated polyester resin prepared by reacting 1,4-cyclohexanedimethanol, neopentyl glycol, tetrahydrophthalic anhydride and maleic anhydride in a molar ratio of about 2/2/1/3. The suspension polymerization was carried out with 0.1% PVA and 10% $CaCl_2$.

Example 92

50% styrene and 50% of an unsaturated polyester resin prepared by reacting propylene glycol, isophthalic acid and maleic anhydride in a molar ratio of about 2.15/1/1. The suspension polymerization was carried out in the presence of 0.1% PVA and 5% NaCl.

TABLE 8

| Ex. No. | Clarity | Ex. No. | Clarity |
|---------|---------|---------|---------|
| 82      | 2       | 87      | 3       |
| 83      | 2       | 88      | 2       |
| 84      | 2       | 89      | 3       |
| 85      | 2       | 90      | 3       |
| 86      | 3       | 91      | 2       |
|         |         | 92      | 2       |

What is claimed is:

1. A method for preparing cured polyester beads of improved clarity comprising suspension polymerizing a curable resin composition of an ethylenically unsaturated polyester and a vinyl monomeric crosslinking agent in an aqueous suspension medium wherein the aqueous medium contains a water soluble salt in a concentration of at least 0.5 percent by weight based on the weight of the aqueous medium, said unsaturated polyester being the reaction product of a polycarboxylic acid and a polyol.

2. A method as in Claim 1 wherein the water soluble salt is present in a concentration of at least about 1.0 percent by weight based on the weight of aqueous medium.

3. A method as in Claim 1 wherein the aqueous suspension medium contains a suspending agent in a concentration of from about 0.005 percent to about 5 percent by weight based on the weight of the aqueous medium.

4. A method as in Claim 2 wherein the aqueous suspension medium contains a suspending agent in a concentration of from about 0.005 percent to about 5 percent by weight based on the weight of the aqueous medium.

5. A method as in Claim 1 wherein the curable resin composition comprises from about 10 to about 90 percent by weight of the unsaturated polyester and from about 90 to about 10 percent by weight of the vinyl monomer.

6. A method as in Claim 2 wherein the curable resin composition comprises from about 10 to about 90 percent by weight of the unsaturated polyester and from about 90 to about 10 percent by weight of the vinyl monomer.

7. A method as in Claim 3 wherein the curable resin composition comprises from about 10 to about 90 percent by weight of the unsaturated polyester and from about 90 to about 10 percent by weight of the vinyl monomer.

8. A method as in Claim 4 wherein the curable resin composition comprises from about 10 to about 90 percent by weight of the unsaturated polyester and from about 90 to about 10 percent by weight of the vinyl monomer.

9. A method as in Claim 5 wherein the curable resin composition comprises from about 20 to about 75 percent by weight of the unsaturated polyester and from about 25 to about 80 percent by weight of the vinyl monomer.

10. A method as in Claim 6 wherein the curable resin composition comprises from about 20 to about 75 percent by weight of the unsaturated polyester and from about 25 to about 80 percent by weight of the vinyl monomer.

11. A method as in Claim 7 wherein the curable resin composition comprises from about 20 to about 75 percent by weight of the unsaturated polyester and from about 25 to about 80 percent by weight of the vinyl monomer.

12. A method as in Claim 8 wherein the curable resin composition comprises from about 20 to about 75 percent by weight of the unsaturated polyester and from about 25 to about 80 percent by weight of the vinyl monomer.

13. A method as in Claim 1 wherein the water soluble salt is selected from the inorganic alkaline and alkaline earth metal halides.

14. A method as in Claim 4 wherein the water soluble salt is selected from the inorgaic alkaline and alkaline earth metal halides.

15. A method as in Claim 10 wherein the water soluble salt is selected from the inorganic alkaline and alkaline earth metal halides.

16. A method as in Claim 12 wherein the water soluble salt is selected from the inorganic alkaline and alkaline earth metal halides.

17. A method as in Claim 12 wherein the unsaturated polyester is comprised of dipropylene glycol and maleic anhydride and the vinyl monomer is styrene.

18. A method as in Claim 16 wherein the unsaturated polyester is comprised of dipropylene glycol and maleic anhydride and the vinyl monomer is styrene.

19. A method as in Claim 12 wherein the salt is sodium chloride and the suspending agent is polyvinyl alcohol.

20. A method as in Claim 16 wherein the salt is sodium chloride and the suspending agent is polyvinyl alcohol.

21. A method for preparing reflex reflective polyester beads which are substantially spherical in shape and which are substantially free of internal voids, encapsulated matter and surface irregularities comprising suspension polymerizing a curable resin composition of from about 10 percent to about 90 percent by weight of an unsaturated polyester and from about 10 percent to about 90 percent by weight of a vinyl monomeric crosslinking agent in an aqueous suspension medium containing at least about 0.5 percent by weight based on the weight of the aqueous medium of a water soluble salt and from about 0.005 percent to about 5 percent by weight based on the weight of the aqueous medium of a suspending agent.

22. A method as in Claim 21 wherein the salt is present in a concentration of at least about 1.0 percent by weight.

23. A method as in Claim 22 wherein the suspending agent is present in a concentration of from about 0.01 percent to about 2.0 percent by weight.

24. A method as in Claim 23 wherein the water soluble salt is selected from the alkaline and alkaline earth metal halides.

25. A method as in Claim 24 wherein the suspending agent is polyvinyl alcohol.

26. A method as in Claim 25 wherein the unsaturated polyester is comprised of dipropylene glycol and maleic anhydride and the vinyl monomer is styrene and the salt is sodium chloride.

27. A method for preparing reflex reflective polyester beads which are substantially spherical in shape and which are substantially free of internal voids, encapsulated matter and surface irregularities comprising suspension polymerizing a curable resin composition of from about 20 percent to about 75 percent by weight of an unsaturated polyester and from about 25 percent to about 80 percent by weight of a vinyl monomeric crosslinking agent in an aqueous suspension medium containing at least about 1.0 percent by weight based on the weight of the aqueous medium of a water soluble salt and from about 0.01 to about 2.0 percent by weight based on the weight of the aqueous medium of a suspending agent.

28. A method as in Claim 27 wherein the salt is selected from the inorganic alkaline and alkaline earth metal halides.

29. A method as in Claim 28 wherein the suspending agent is an inorganic polymeric suspending agent.

30. A method as in Claim 27 wherein the salt is sodium chloride and the suspending agent is polyvinyl alcohol.

31. A method as in Claim 27 wherein the unsaturated polyester is comprised of dipropylene glycol and maleic anhydride and the vinyl monomer is styrene.

32. A method according to Claim 27 wherein said crosslinking agent is about 40 to about 95 percent by weight of styrene and about 5 to about 60 percent by weight of a lower alkyl acrylate or methacrylate.

33. A method according to Claim 27 including also a lauroyl peroxide curing catalyst.

34. A method according to Claim 27 including also an ultraviolet stabilizer.

35. A method according to Claim 27 wherein the polymerization is carried out in an oxygen free atmosphere.

36. A method as in Claim 30 wherein the unsaturated polyester is comprised of dipropylene glycol and maleic anhydride and the vinyl monomer is styrene.

References Cited
UNITED STATES PATENTS

| | | | |
|---|---|---|---|
| 2,712,536 | 7/1955 | Winslow | 260—884 X |
| 3,210,443 | 10/1965 | Reddie et al. | 264—14 |
| 3,479,303 | 11/1969 | Wieschollek et al. | 161—170 |
| 3,539,441 | 11/1970 | Rabenold. | |

WILLIAM H. SHORT, Primary Examiner

E. A. NIELSEN, Assistant Examiner

U.S. Cl. X.R.

117—100 R; 260—29.6 NR

PO-1050
(5/69)

UNITED STATES PATENT OFFICE
CERTIFICATE OF CORRECTION

Patent No. 3,823,202            Dated July 9, 1974

Inventor(s) Lloyd R. Buzbee and Robert D. Lake

It is certified that error appears in the above-identified patent and that said Letters Patent are hereby corrected as shown below:

Line 1 - Column 2 - "An example of a reflex reflective application in which"

Line 8 - Column 3 - "Kolodny, U. S. Pat. No. 3,089,542 discloses an aqueous"

Line 15 - Column 3 - "ceptable for use in reflex reflective applications."

Line 24 - Column 6 - "above, the alkyl acrylate or methacrylate improves the"

Line 28 - Column 6 - "by using the alkyl acrylate or methacrylate exclusively"

Line 38 - Column 20 - "50% styrene and 50% of an unsaturated polyester resin"

Signed and sealed this 26th day of November 1974.

(SEAL)
Attest:

McCOY M. GIBSON JR.            C. MARSHALL DANN
Attesting Officer            Commissioner of Patents